United States Patent [19]
Sanger et al.

[11] Patent Number: 5,667,001
[45] Date of Patent: Sep. 16, 1997

[54] COPING CUTTING APPARATUS

[76] Inventors: Wallace D. Sanger, 858 Gardenia St., Royal Palm Beach, Fla. 33411; James Headberg, 15310 Take Off Place, West Palm Beach, Fla. 33414

[21] Appl. No.: 577,252

[22] Filed: Dec. 22, 1995

Related U.S. Application Data

[63] Continuation-in-part of Ser. No. 504,186, Jul. 19, 1995.

[51] Int. Cl.$^6$ ...................................... B27G 5/02
[52] U.S. Cl. ........................ 144/144.1; 144/135.3; 144/154.5; 144/372; 409/125; 409/130
[58] Field of Search ............... 144/137, 136.95, 144/144.1, 144.3, 144.51, 154.5, 150, 135.3, 371, 372; 409/125, 130, 181, 182, 183

[56] References Cited

U.S. PATENT DOCUMENTS

| | | | |
|---|---|---|---|
| 2,323,587 | 7/1943 | Duffy | 144/144.3 |
| 3,146,812 | 9/1964 | Fleischer | 144/144.1 |
| 3,301,287 | 1/1967 | Edwards | 144/144.1 |
| 3,442,309 | 5/1969 | Jentsch | 144/144.1 |
| 3,865,162 | 2/1975 | Schmidt | 144/144.1 |
| 3,942,566 | 3/1976 | Schmidt | 144/144.1 |
| 4,742,856 | 5/1988 | Hehr et al. | 144/353 |

*Primary Examiner*—W. Donald Bray
*Attorney, Agent, or Firm*—Frank L. Kubler

[57] ABSTRACT

An apparatus for cutting an end of a work piece having a work piece curved face along a curve which is substantially the mirror image of the cross-sectional curvature of the work piece curved face includes a work piece support structure; a work piece anchoring and positioning structure for securing the work piece onto the support structure in a position to be cut; a cutting assembly carriage structure mounted to move toward and away from the end of the work piece; a work piece cutting assembly slidably mounted on the cutting assembly guide structure and including a work piece cutting member; a cutting member guide structure including a guide template having a template guide surface with a guide surface contour; and a guide surface following structure connected to the work piece cutting assembly for guiding the cutting member along a path substantially duplicating the guide surface contour. The work piece support structure preferably includes a platform member resting on several platform member legs. The work piece cutting assembly guide structure preferably includes a rail arm including an elongate member pivotally connected to the apparatus to pivot toward and away from the work piece; where the cutting assembly carriage is slidably mounted on the rail arm. The work piece cutting assembly preferably includes a router motor tool having a router bit secured into a router chuck which is mounted on a drive shaft of a router motor, where the router motor tool is mounted on the carriage.

18 Claims, 8 Drawing Sheets

COPING CUTTING APPARATUS

BACKGROUND OF THE INVENTION

This Application is a continuation-in-part of application Ser. No. 08/504,186, filed on Jul. 19, 1995.

1. Field of the Invention

The present invention relates generally to the field of work piece cutting machinery. More specifically the present invention relates to an apparatus for cutting an end of a coping strip along a curve which is the mirror image, or negative, of the cross-sectional curvature of the coping strip face. An end of a first coping strip is cut by the apparatus along this negative curve and is then placed against the face of an intersecting second coping strip, so that the first coping strip cut end and the second coping strip face mesh together to create a flush right corner.

The apparatus includes a coping strip support platform resting on platform legs and a coping strip positioning and anchoring assembly mounted on the platform. A router assembly is provided for cutting the negative curve, including a router motor tool having a router motor, a router chuck and a router bit, which is secured to a carriage slidably mounted on a rail arm. The rail arm rotatably extends from a fulcrum attached to the platform, and pivots toward and away from the work piece end. The carriage rides along the rail arm during work piece cutting. A tracking stylus protrudes vertically downward from the carriage. The stylus rides against a guide template having a guide edge matching the negative curve to be cut, to simultaneously guide the router bit along a duplicate cutting path through the work piece.

The coping strip support platform preferably includes a rectangular support plate having a downwardly extending platform leg at each corner. A rubber foot or scratch shield cap is fit over the lower end of each leg. Near one end of the platform is a router bit passing opening through which the router bit extends during cutting.

2. Description of the Prior Art

There have long been devices for cutting coping strips and other types of molding strips to cause the strips to matingly fit together at corners. These devices have generally included miter guide structures to guide a cutting tool at an angle relative to the plane of the strip, usually at forty five degrees. Miter cutting causes two strip ends to mate at the angle of the corner where they are to meet. A problem with mitered strip ends at right, or perpendicular, corners has been that, absent a virtually perfect alignment, accomplished with substantial skill, effort and good fortune, the ends do not quite meet directly. As a result, a portion of one of the mitered end faces is sometimes exposed, creating an amateurish, shoddy appearance.

It is thus an object of the present invention to provide a coping cutting apparatus which cuts an end of a first coping strip along a curved path which is the mirror image of the coping strip face cross-sectional curve, so that the cut end fits flush against the face of a second such coping strip.

It is another object of the present invention to provide such an apparatus which can be easily adjusted to cut an endless variety of such curves to accommodate virtually any coping style.

It is still another object of the present invention to provide such an apparatus which can miter cut a coping strip at various angles relative to the plane of the strip for mitered outside corners and for mitered non-perpendicular inside corners.

It is finally an object of the present invention to provide such an apparatus which is sturdy, reliable, easy and efficient to use, which is relatively inexpensive to manufacture and which is suited to making curved cuts in work pieces other than coping strips.

SUMMARY OF THE INVENTION

The present invention accomplishes the above-stated objectives, as well as others, as may be determined by a fair reading and interpretation of the entire specification.

An apparatus is provided for cutting an end of a work piece having a work piece curved face along a curve which is substantially the mirror image of the cross-sectional curvature of the work piece curved face, including a work piece support structure; a work piece anchoring and positioning structure for securing the work piece onto the support structure in a position to be cut; a cutting assembly carriage structure mounted to move toward and away from the end of the work piece; a work piece cutting assembly slidably mounted on the cutting assembly guide structure and including a work piece cutting member; a cutting member guide structure including a guide template having a template guide surface with a guide surface contour; and a guide surface following structure connected to the work piece cutting assembly for guiding the cutting member along a path substantially duplicating the guide surface contour.

The work piece support structure preferably includes a platform member resting on several platform member legs. The work piece cutting assembly guide structure preferably includes a rail arm including an elongate member pivotally connected to the apparatus to pivot toward and away from the work piece; where the cutting assembly carriage is slidably mounted on the rail arm. The work piece cutting assembly preferably includes a router motor tool having a router bit secured into a router chuck which is mounted on a drive shaft of a router motor, where the router motor tool is mounted on the carriage. The rail arm preferably pivotally extends from a fulcrum structure attached to the platform member. The rail arm preferably takes the form of a longitudinal track structure along which the carriage rides during work piece cutting. The following structure preferably includes a stylus protruding from the carriage and riding against the template guide surface. The template guide surface optionally substantially matches the mirror image of the curve. The platform member is preferably substantially planar and rectangular and one of the several leg members preferably extends downwardly from each corner of the rectangular platform member, the platform member including a cutting assembly passing opening through which the cutting assembly extends during work piece cutting. Where the platform member has a first surface and a second surface, the anchoring and positioning structure preferably additionally includes two mutually parallel and laterally spaced apart work piece retaining rails secured to the platform member first surface, for retaining between the retaining rails the work piece to be cut; a work piece bracing plate secured across the retaining rails and placed apart from the platform member a sufficient distance to permit passage of the work piece between the bracing plate and the platform member; a clamping plate adjacent to the platform member and directly opposing and spaced apart from the bracing plate a sufficient distance to permit passage of the work piece between the clamping plate and the bracing plate; a clamping plate moving structure for moving the clamping plate toward the bracing plate to clamp the work piece between the clamping plate and the bracing plate and to subsequently move the clamping plate away from the bracing plate to release the work piece for removal from the apparatus. The clamping plate moving structure preferably includes a work piece clamping lever pivotally mounted on a lever fulcrum structure protruding from the second surface of the platform member, the lever fulcrum structure including two parallel and laterally spaced apart fulcrum flanges, the fulcrum flanges having mutually aligned fulcrum flange bores through which a fulcrum bolt is fitted, the lever having a fulcrum lever bore and being fit between the flanges so that the fulcrum lever bolt passes through the fulcrum lever bore and the fulcrum flange bores simultaneously. The work piece clamping lever preferably has a handle end and has a cam end with a cam surface, where the cam surface bears against the clamping plate, so that as the handle end is pivoted in one rotational direction, the cam surface rides against the clamping plate to push the clamping plate toward the bracing plate to clamp the work piece between the clamping plate and the bracing plate and thereby anchor the work piece during cutting, and so that as the handle end is pivoted in the other rotational direction the cam surface and thus the clamping plate moves away from the bracing plate and the work piece is thereby released for removal from the apparatus. The apparatus may additionally include a clamping plate opening in the platform member and a clamping plate fits within the clamping plate opening, the clamping plate opening including a clamping plate support structure for supporting the clamping plate within the clamping plate opening. The rail arm is preferably an elongate bar having a longitudinal axis and a rectangular cross-section and the carriage preferably has a like-shaped and sized rectangular rail arm receiving port, so that the carriage cannot rotate about the longitudinal axis of the rail arm. The carriage preferably includes a carriage first portion intersecting a carriage second portion, the carriage first portion including a rectangular rail port sized to closely fit around the rail arm, so that the carriage is free to slide along the rail arm, and the carriage second portion includes a cutting assembly mounting port into which the work piece cutting assembly is secured. The following structure preferably includes a stylus member and the carriage preferably includes a stylus port into which the stylus member is fitted and secured, and positioned laterally adjacent to the guide template, to abut and ride along the template guide surface. The guide template is preferably removably secured to a first surface of the bracing plate with fasteners. The guide template is preferably removable, including several of the guide templates having differently contoured guide surfaces for cutting a variety of curves.

The guide template alternatively includes several parallel and laterally abutting slats having slat guide ends, so that a work piece curved face may be placed against the slat guide ends and the slats may be slid longitudinally relative to each other to each abut the curved face and thus to describe the mirror image of the curved face, and so that the work piece may be subsequently lifted away; and a lateral template plate clamp for applying lateral pressure against the slats so that friction anchors the slats in the staggered arrangement so that the slat guide ends define the mirror image of the curved face; where the slat guide ends together form the guide surface along which the following structure rides to move the work piece cutting member along the path during work piece cutting.

An apparatus is also provided for cutting an end of a work piece along a curved path, including an elongate work piece having a work piece end; a work piece support structure; a work piece anchoring and positioning structure for securing the work piece onto the support structure in position for cutting the work piece end; a cutting assembly guide structure mounted to move toward and away from the work piece end; a work piece end cutting assembly slidably mounted on the cutting assembly guide structure and having a work piece end cutting member; a cutting member guide structure including a guide template having a template guide surface with a guide surface curve; and a guide surface following structure connected to the work piece cutting assembly for guiding the cutting member along the curved path through the work piece end substantially duplicating the guide surface curve.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 1:
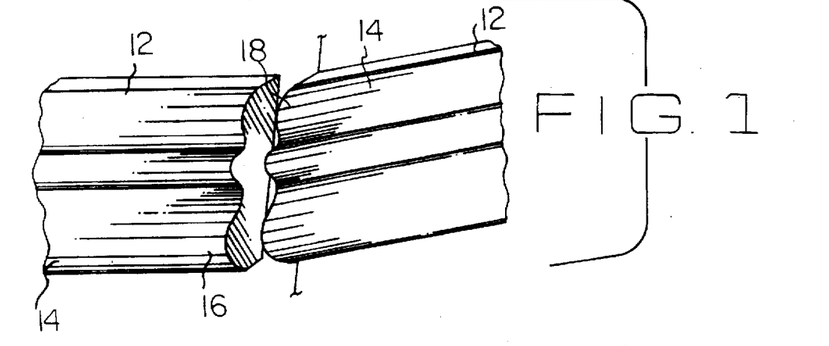
FIG. 1 is a perspective view of a coping strip with a strip end cut with the inventive apparatus to mesh flush with the face of another coping strip at an inside corner, the two strips being spaced apart for illustration.
Figure 2:
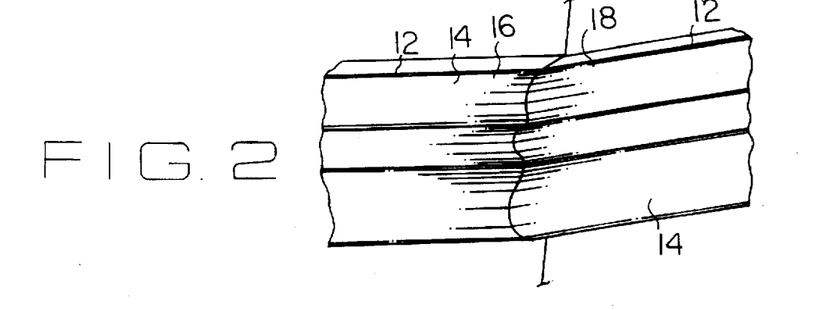
FIG. 2 is a view as in FIG. 1, wherein the coping strips are fit together in their final arrangement.
Figure 3:
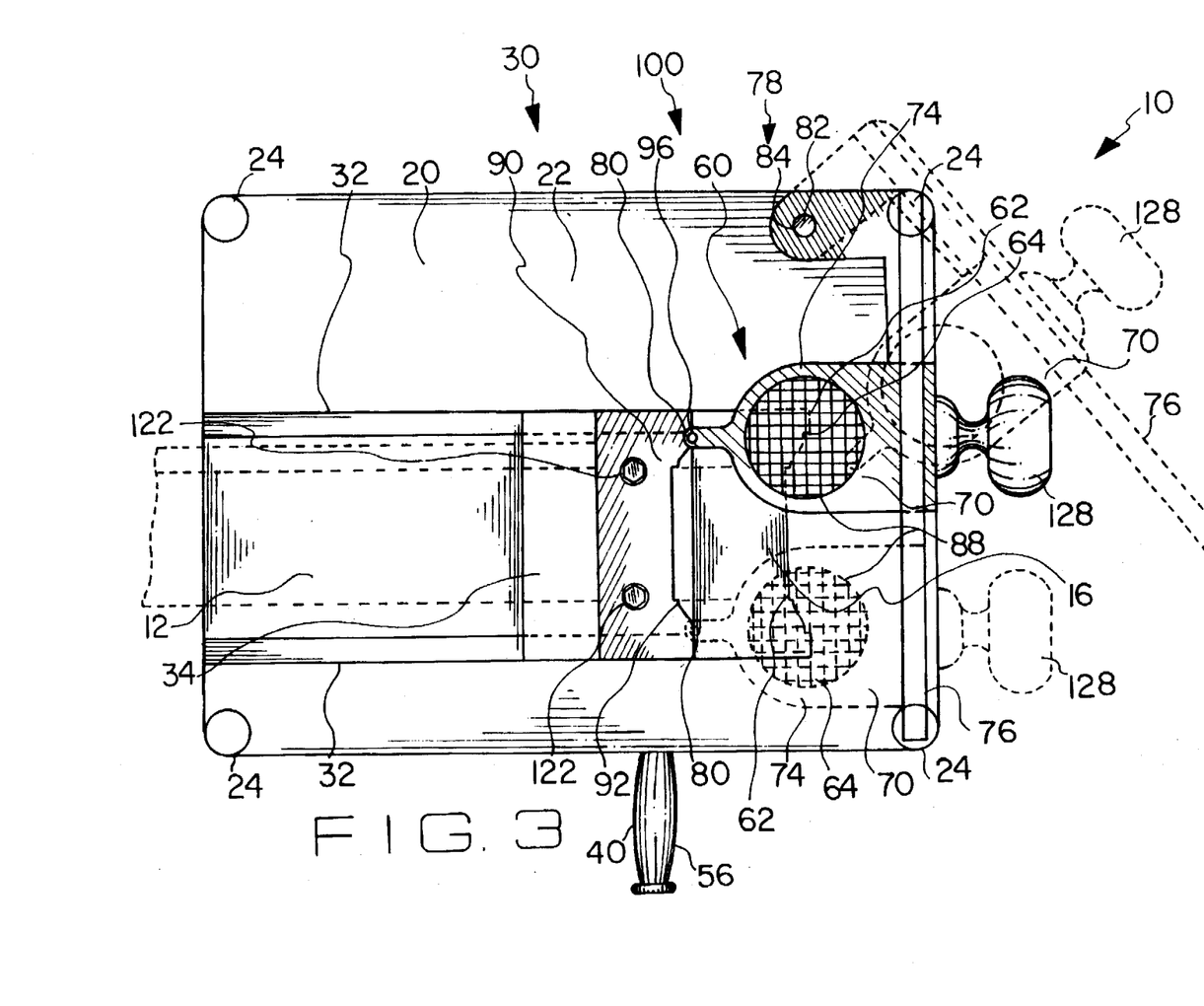
FIG. 3 is a transparent top view of the first preferred embodiment of the inventive apparatus, shown holding a work piece.
Figure 4:
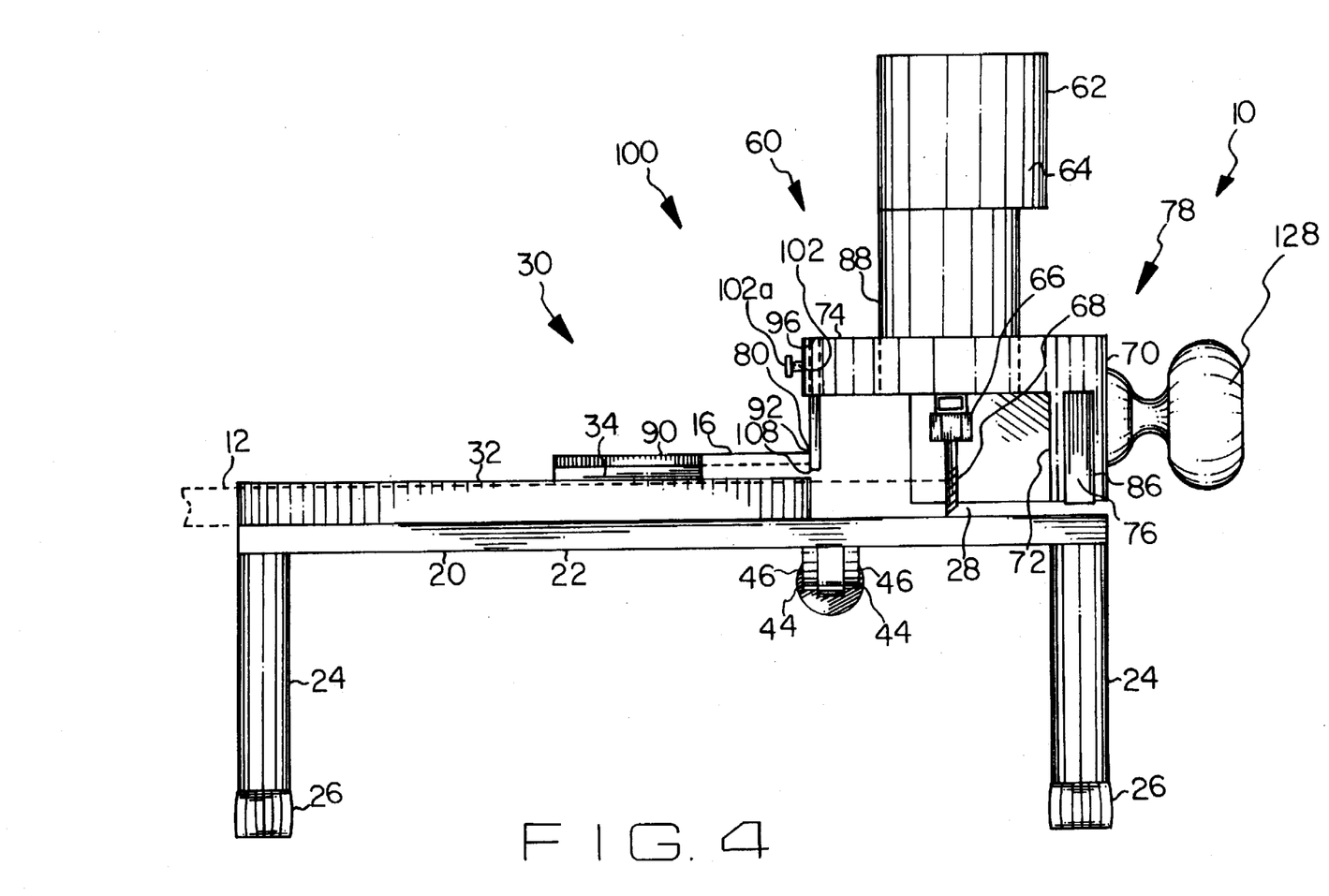
FIG. 4 is a front view of the apparatus of FIG. 3, with the work piece clamping lever removed.
Figure 5:
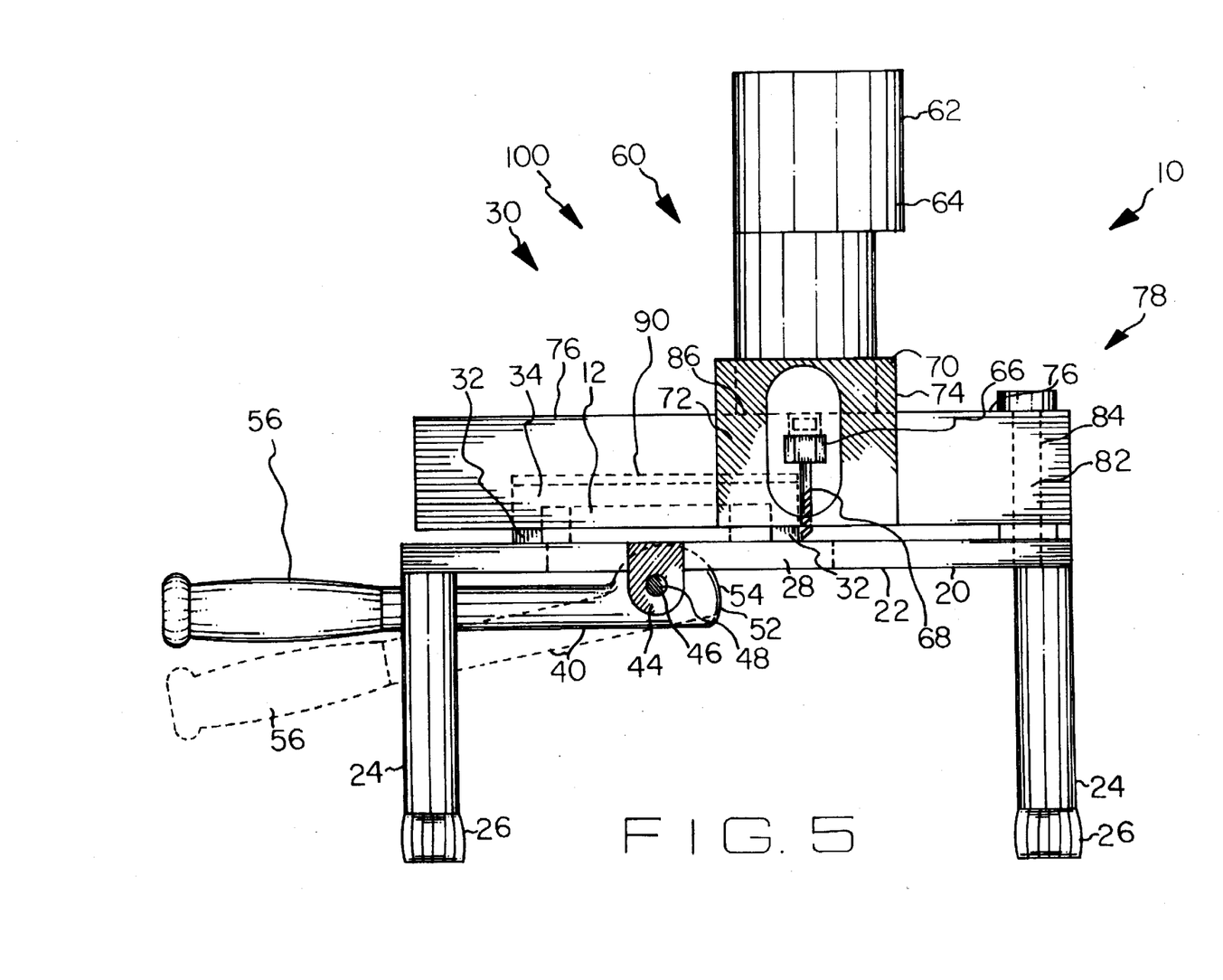
FIG. 5 is side view of the apparatus of FIG. 3, with the knob and a section of the carriage cut away to reveal the router chuck and router bit.
Figure 6:
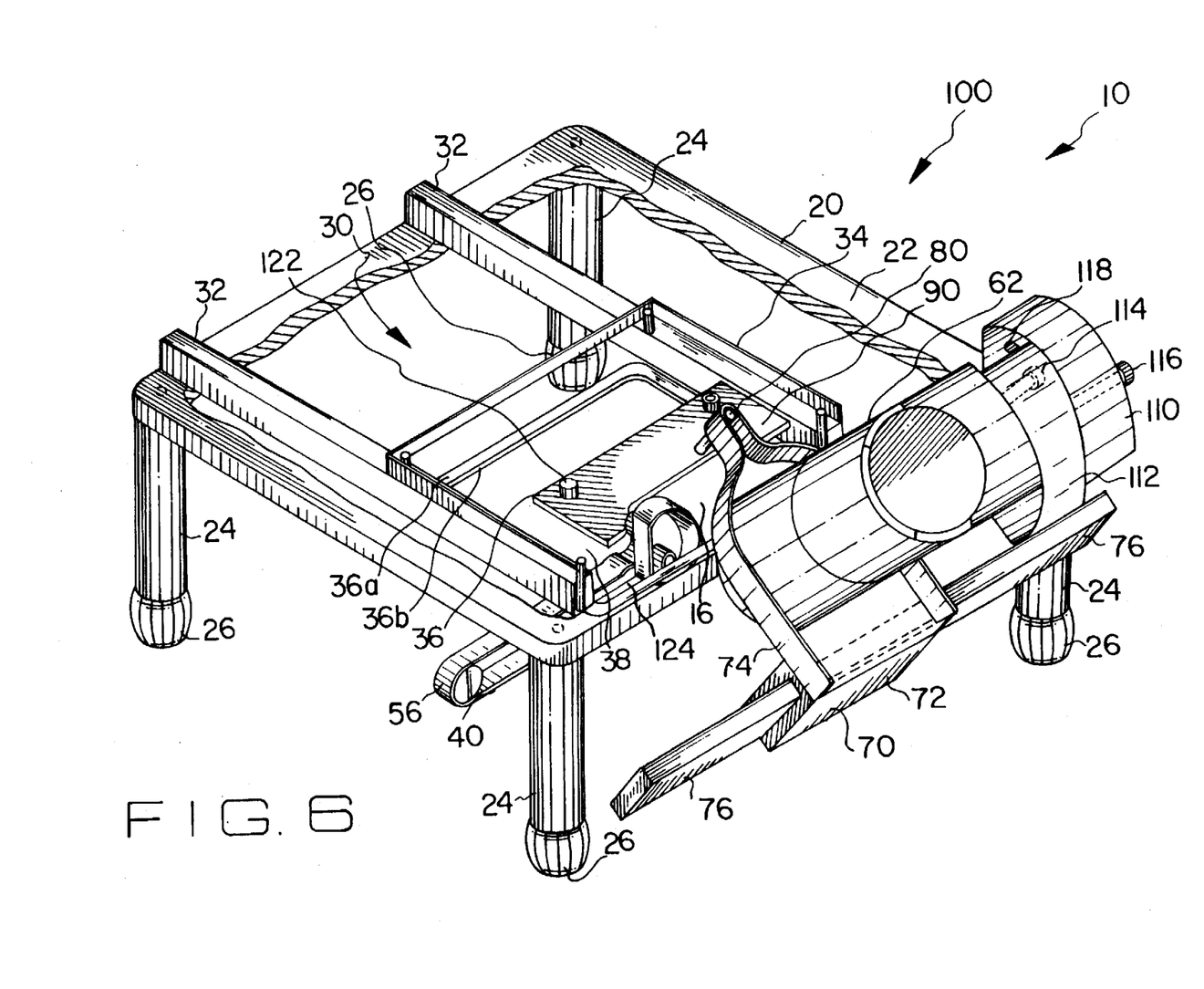
FIG. 6 is a transparent perspective view of the apparatus including the optional rail arm rotating structure for mitering non-perpendicular inside corners and outside corners.
Figure 7:
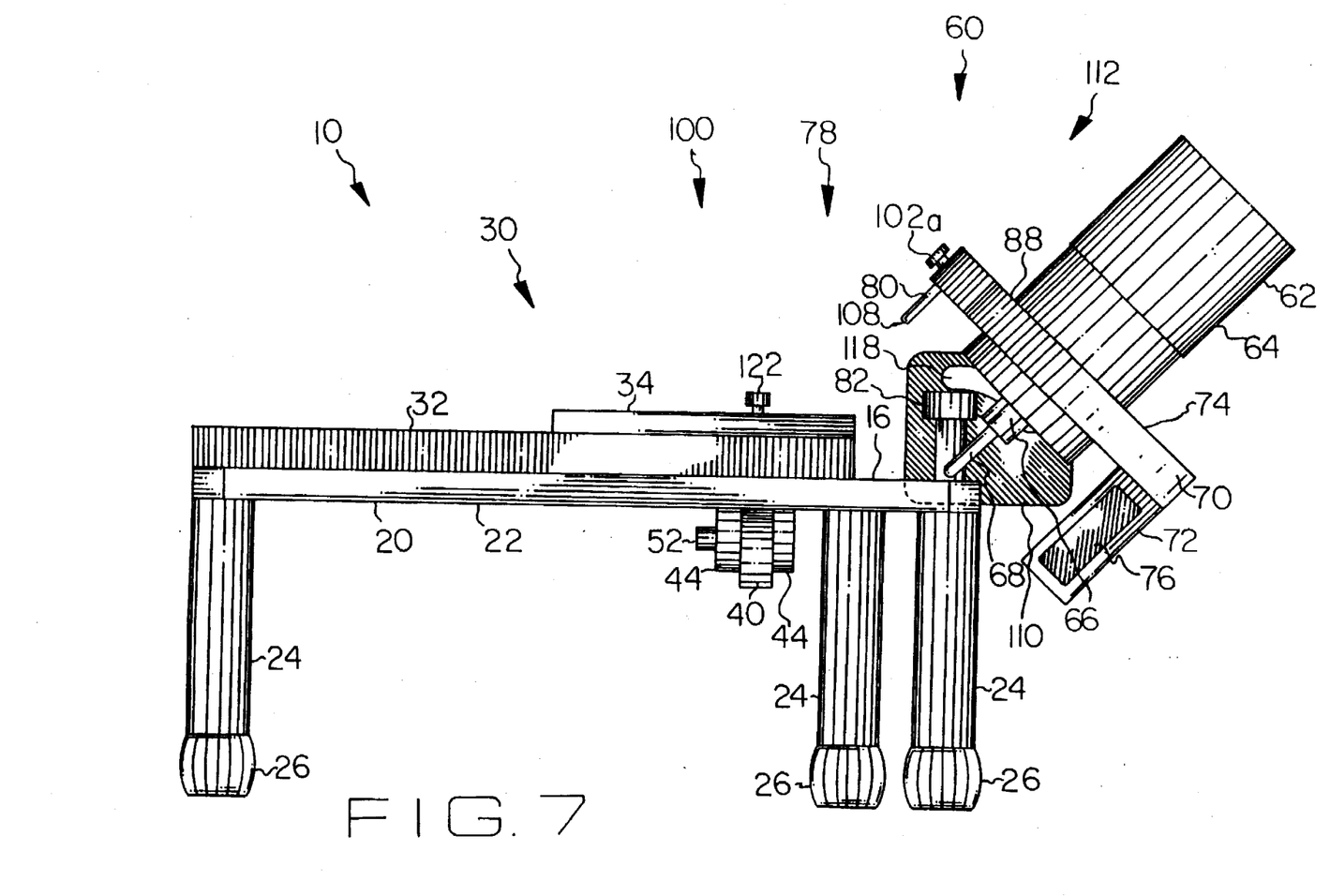
FIG. 7 is a front view of the apparatus of FIG. 6.
Figure 8:
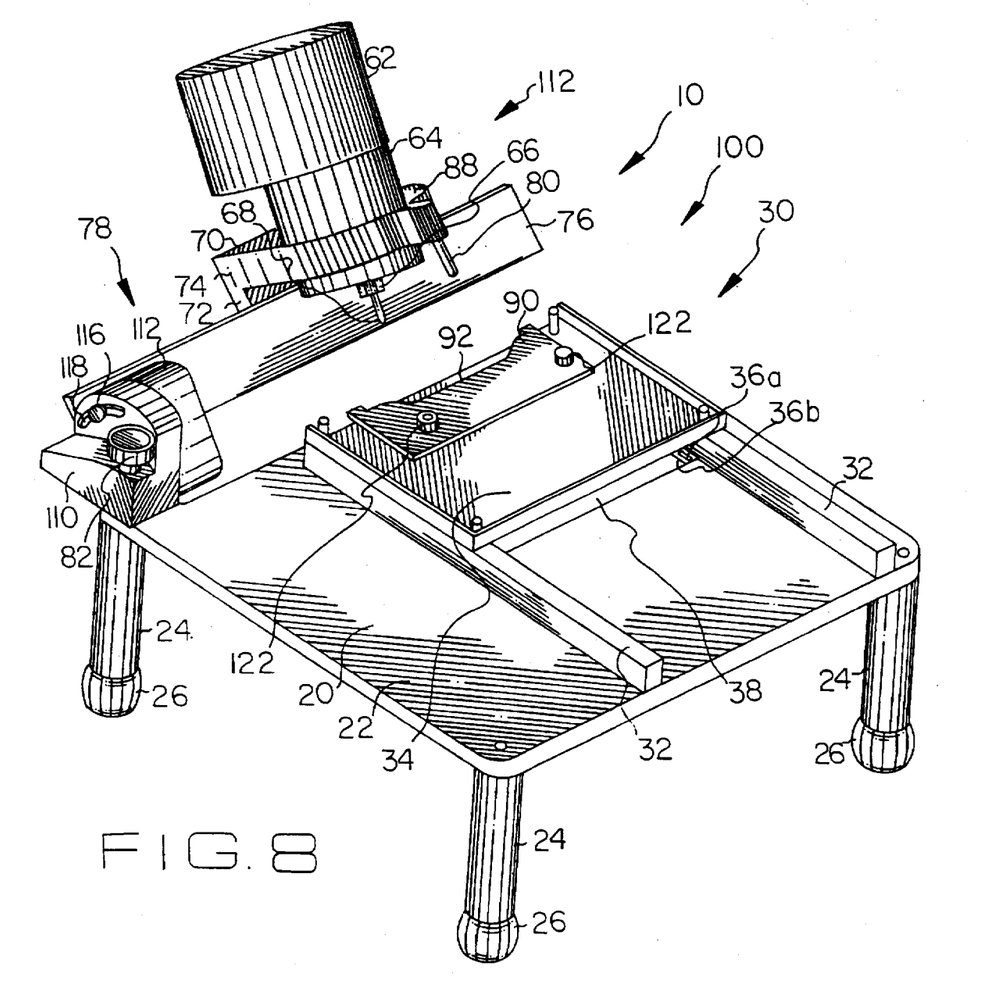
FIG. 8 is a perspective rear view of the apparatus revealing a preferred rail arm rotating and fulcrum structure.
Figure 9:
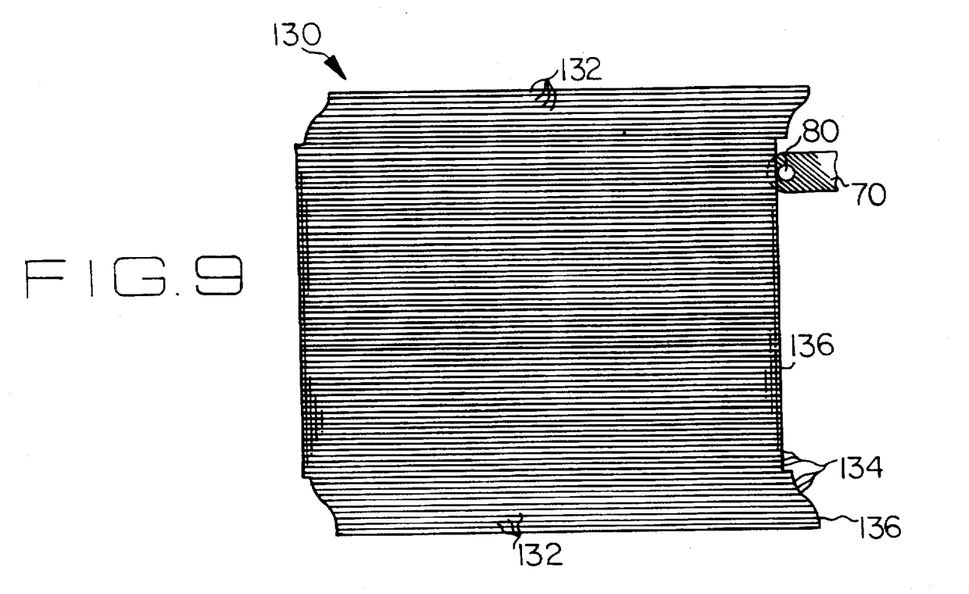
FIG. 9 is a top view of the optional composite template formed of an array of laterally abutting slats.
Figure 10:
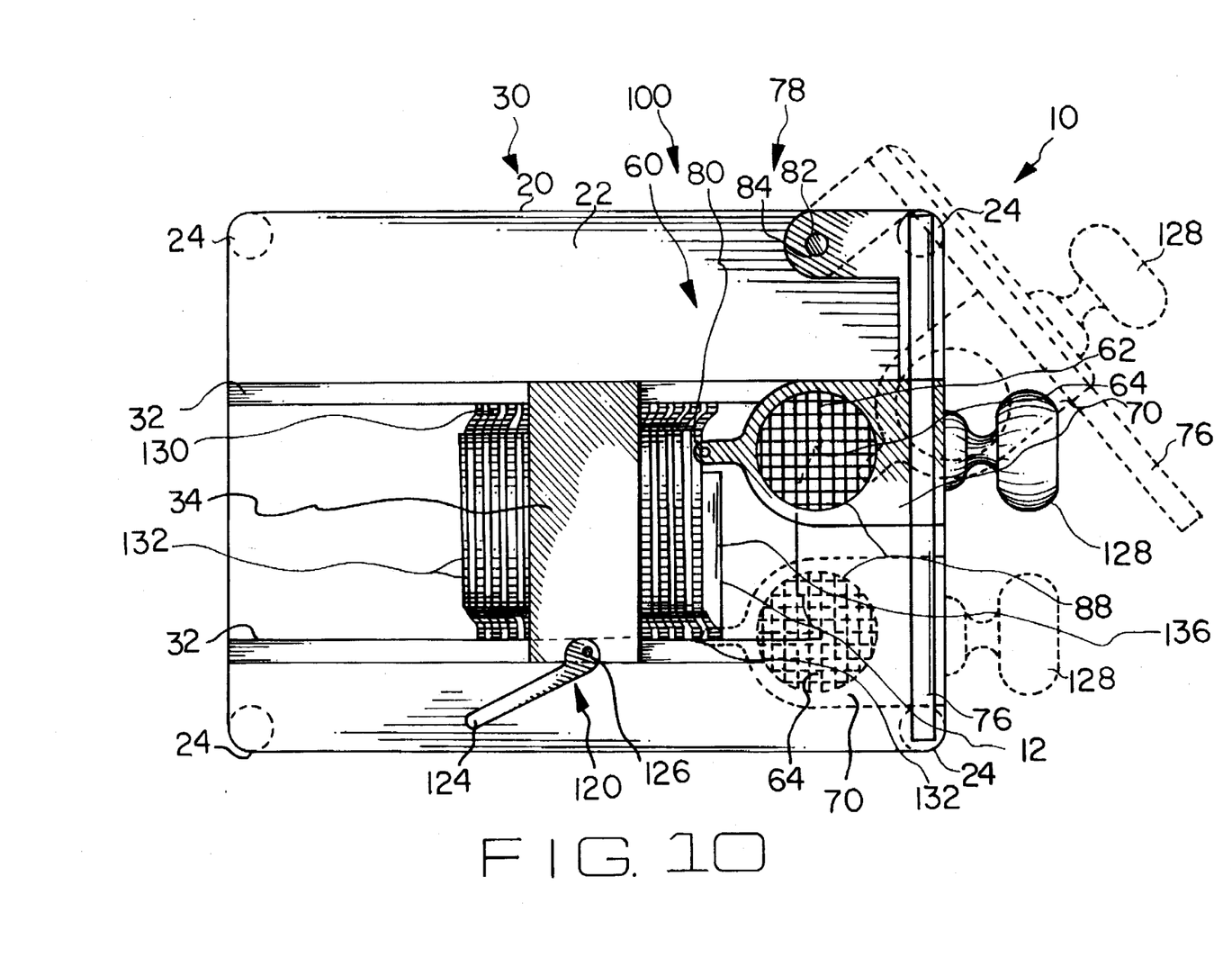
FIG. 10 is a top view of the apparatus of FIG. 3, but with the composite template substituted for the single plate template, and a the template clamping structure added.

Referring to FIGS. 1–10, an apparatus 10 for cutting an end of a coping strip work piece 12 to permit the formation of flush work piece 12 corners is disclosed. Apparatus 10 cuts an end of a work piece 12 along a curve which is the mirror image, or negative, of the cross-sectional curvature of the given work piece face 14. An end 16 of a first work piece 12 is cut by apparatus 10 along this negative curve and is then placed against a strip face 14 near an end 18 of an intersecting second work piece 12, so that the first work piece cut end 16 and the second work piece face 14 mesh together to create a flush corner. See FIGS. 1 and 2.

Apparatus 10 preferably includes a work piece support platform 20 having a work piece positioning and anchoring assembly 30. See FIGS. 3–5. A cutting tool such as a router assembly 60 is provided for cutting the curve, including a router motor tool 62 having a router motor 64, a router chuck 66 and a router bit 68, and is secured on a carriage 70 slidably mounted on a pivoting rail arm 76. The pivoting rail arm 76 rotatably extends from an arm fulcrum structure 78 attached to platform 20, and pivots toward and away from work piece 12. Rail arm 76 takes the form of a longitudinal track structure along which carriage 70 rides during work piece 12 cutting. A router bit guide assembly 100 includes a tracking stylus 80 which protrudes vertically downward from carriage 70 and rides against a guide template 90 having a guide surface 92 matching the negative curve to be cut.

Work piece support platform 20 preferably includes a rectangular support plate 22 having a downwardly extending platform leg 24 at each plate 22 corner. A scratch shield cap 26 is fit over the lower end of each leg 24. Near one end of plate 22 is a router bit passing opening 28 through which router bit 68 extends during work piece 12 cutting. To provide a frame of reference for the following description, platform support plate 22 is assumed to be positioned generally horizontally. It is understood, however, that plate 22 and the entire apparatus 10 is capable of functioning in a variety of other orientations.

Work piece positioning and anchoring assembly 30 preferably includes two parallel and laterally spaced apart work piece retaining rails 32 secured to the plate 22 upper surface. See FIG. 1. The coping strip work piece 12 to be cut is placed between retaining rails 32. A work piece bracing plate 34 is secured across the upper faces of retaining rails 32. A section is cut out of plate 22 beneath bracing plate 34 to form a clamping plate opening 36, and a clamping plate 38 which is thinner than plate 22 and which is sized and shaped to fit closely within opening 36 rests on a ledge 36b protruding from lower clamping plate opening side wall 36a. See FIGS. 4 and 5. A clamping plate elevating lever 40 is pivotally mounted on a lever fulcrum structure 42 protruding from the lower face of plate 22. Lever fulcrum structure 42 preferably includes two parallel and laterally spaced apart fulcrum flanges 44, the fulcrum flanges 44 having mutually aligned fulcrum bores 46 through which a fulcrum bolt 48 is fitted. Lever 40 has a fulcrum lever bore (not shown) and fits closely between flanges 44 so that bolt 48 passes through fulcrum lever bore 46a when fitted through bores 46. Lever 40 has a cam end 52 with a cam surface 54 and a handle end 56. Cam surface 54 bears against the lower surface of clamping plate 38. As handle end 56 is pivoted downwardly, the cam surface 54 rides up against clamping plate 38 to push clamping plate 38 upwardly toward bracing plate 34 to clamp the coping strip work piece 12 between clamping plate 38 and bracing plate 34 to anchor the work piece 12 during cutting. To release the work piece 12, handle end 56 is pivoted upwardly, so that the cam surface 54 contact line moves downwardly, permitting clamping plate 38 to also move downwardly with gravity and ultimately to rest on the clamping plate ledge. As clamping plate 38 moves downwardly the cut work piece 12 is released and may be slid out from between retaining rails 32.

Rail arm 76 of router assembly 60 is preferably an elongate metal bar having a rectangular cross-section which fits through a rectangular rail arm port 86 in carriage 70. See FIGS. 3 and 4. Rail arm port 86 is sized to closely fit around rail arm 76, so that carriage 70 can slide along rail arm 76 but cannot rotate about the axis of rail arm 76. Rail arm fulcrum structure 78 preferably includes an arm fulcrum bolt 82 mounted in and extending perpendicularly upward from plate 22, and an arm fulcrum bore 84 passing vertically through rail arm 76 for receiving arm fulcrum bolt 82. Carriage 70 is preferably a generally L-shaped member having a carriage vertical portion 72 and a carriage horizontal portion 74. Carriage vertical portion 72 preferably includes rectangular rail arm port 86. Lubrication is preferably provided on rail arm 76 for low friction movement of carriage 70. Carriage horizontal portion 74 preferably includes a motor port 88 into which the router motor 64 is snugly fit, and a lateral threaded bore (not shown) through which a set screw (not shown) extends to removably anchor router motor 64 into carriage 70. A stylus port 96 is preferably provided in carriage horizontal portion 74, spaced apart from motor port 88 and opposite carriage vertical portion 72. A narrow tipped tracking stylus 80 is snugly fitted into stylus port 96 and removably secured with a set screw 102a passing through a threaded bore 102 in carriage horizontal portion 74, so that stylus 80 is oriented vertically. Stylus 80 narrow tip 108 is preferably directed downwardly, and laterally adjacent to guide template 90, to abut and ride along template guide surface 92.

Apparatus 10 preferably also miters work piece 12 ends for outside corners and for inside corners which are other than ninety degrees. To perform this optional function, rail arm fulcrum structure 78 preferably includes a pivoting guide plate 110 vertically and rotatably mounted on arm fulcrum bolt 82. Rail arm 76 affixed to an arm hub structure 112. Hub structure 112 which is rotatably mounted on a miter pivot bolt 114 extending substantially perpendicularly from pivoting guide plate 110. See FIGS. 6, 7 and 8. Hub structure 112 has a miter guide bolt 116 which protrudes through an arcuate slot 118 in guide plate 110. Miter guide bolt 116 can be tightened against pivoting guide plate 110 to lock rail arm 76 into a selected miter angle. Arm fulcrum structure 82 is locked against rotation about arm fulcrum bolt 82 in a position perpendicular to work piece 12 to assure a square miter cut. This locking of arm fulcrum structure 78 is accomplished with any well known rotational locking means. It is preferred that stylus 80 does not engage template guide surface 92 during miter cutting, to assure a rectilinear cut line.

It is alternatively contemplated, however, that stylus 80 engage template plate surface 92 and that arm fulcrum structure 82 not be locked against rotation. This arrangement permits cutting a template pattern at a mitered angle, should such a combination cut be desired.

Router motor tool guide assembly 100 preferably includes guide template 90 which preferably takes the form of a plate and guide surface 92 preferably takes the form of a contoured plate edge, cut to match the above-described negative curve. Guide template 90 is removably secured to the upper surface of bracing plate 34 with anchor screws 122, which are preferably Allen screws. Guide template 90 is preferably positioned so that guide surface 92 is directly on top of bracing plate 34, but may alternatively protrude horizontally off bracing plate 34 and over router bit passing opening 28. A template clamp 120 may be provided to laterally anchor guide template 90, the clamp 120 taking the form of a cammed lever 124 and fulcrum 126 similar to that described for operating clamping plate 38. Apparatus 10 is preferably provided with several guide templates 90 having different guide surface 92 curves corresponding to various work piece 12 shapes. A template 90 is removed from apparatus 10 by removing anchor screws 122 and another template 90 is mounted as needed for a particular cutting job. Carriage 70 preferably includes a lateral knob 128 or handle protruding from carriage vertical portion 72 oppositely from carriage horizontal portion 74 for the user to grip while pulling carriage 70 along rail arm 76.

An alternative template structure is a composite template 130 made up of a series of parallel and laterally abutting slats 132, having guide ends 134. See FIGS. 9 and 10. Slats 132 are preferably made of metal, but other materials are contemplated. A work piece curved face 14 is placed against guide ends 134 of slats 132, and slats 132 slide longitudinally to each abut curved face 14 and thus to describe in combination the negative of the face 14 curve. Then work piece 12 is lifted away from ends 134 and the lateral template plate clamp 120 mentioned above is operated to apply lateral pressure against slats 132 so that friction mutually anchors slats 132 in the staggered arrangement defining the negative curve. Guide ends 134 of slats 132 together constitute a composite template guide surface 136 along which stylus 80 rides to move router bit 68 along a duplicate curve path during work piece 12 cutting.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for cutting an end of a work piece having a work piece curved face along a curve which is substantially the mirror image of the cross-sectional curvature of said work piece curved face, comprising:

work piece support means;

work piece anchoring and positioning means for securing said work piece onto said support means in a position to be cut;

a cutting means carriage structure mounted to move toward and away from said end of said work piece;

work piece cutting means slidably mounted on said cutting means guide structure and including a work piece cutting member;

cutting member guide means comprising a guide template having a template guide surface with a guide surface contour;

and a guide surface following structure connected to said work piece cutting means for guiding said cutting member along a path substantially duplicating said guide surface contour;

wherein said work piece support means comprises a platform member resting on a plurality of platform member legs;

wherein said work piece cutting means guide structure comprises a rail arm including an elongate member pivotally connected to said apparatus to pivot toward and away from said work piece;

wherein said cutting means carriage is slidably mounted on said rail arm.

2. The apparatus of claim 1, wherein said work piece support means comprises:

a platform member resting on a plurality of platform member legs.

3. The apparatus of claim 1, wherein said work piece cutting means comprises a router motor tool having a router bit secured into a router chuck which is mounted on a drive shaft of a router motor, wherein said router motor tool is mounted on said carriage.

4. The apparatus of claim 1, wherein said rail arm pivotally extends from a fulcrum structure attached to said platform member.

5. The apparatus of claim 1, wherein said rail arm takes the form of a longitudinal track structure along which said carriage rides during work piece cutting.

6. The apparatus of claim 1, wherein said following structure comprises a stylus protruding from said carriage and riding against said template guide surface.

7. The apparatus of claim 1, wherein said template guide surface substantially matches said mirror image of said curve.

8. The apparatus of claim 1, wherein said rail arm is an elongate bar having a longitudinal axis and a rectangular cross-section and wherein said carriage has a like-shaped and sized rectangular rail arm receiving port, such that said carriage cannot rotate about said longitudinal axis of said rail arm.

9. The apparatus of claim 8, wherein said carriage comprises a carriage first portion intersecting a carriage second portion, said carriage first portion comprising a rectangular rail port sized to closely fit around said rail arm, such that said carriage is free to slide along said rail arm, and said carriage second portion comprises a cutting means mounting port into which said work piece cutting means is secured.

10. An apparatus for cutting an end of a work piece having a work piece curved face along a curve which is substantially the mirror image of the cross-sectional curvature of said work piece curved face, comprising:

work piece support means;

work piece anchoring and positioning means for securing said work piece onto said support means in a position to be cut;

a cutting means carriage structure mounted to move toward and away from said end of said work piece;

work piece cutting means slidably mounted on said cutting means guide structure and including a work piece cutting member;

cutting member guide means comprising a guide template having a template guide surface with a guide surface contour;

and a guide surface following structure connected to said work piece cutting means for guiding said cutting member along a path substantially duplicating said guide surface contour;

wherein said work piece support means comprises a platform member resting on a plurality of platform member legs;

wherein said platform member is substantially planar and rectangular and wherein one of said plurality of leg members extends downwardly from each corner of said rectangular platform member, said platform member including a cutting means passing opening through which said cutting means extends during work piece cutting.

11. An apparatus for cutting an end of a work piece having a work piece curved face along a curve which is substantially the mirror image of the cross-sectional curvature of said work piece curved face, comprising:

work piece support means;

work piece anchoring and positioning means for securing said work piece onto said support means in a position to be cut;

a cutting means carriage structure mounted to move toward and away from said end of said work piece;

work piece cutting means slidably mounted on said cutting means guide structure and including a work piece cutting member;

cutting member guide means comprising a guide template having a template guide surface with a guide surface contour;

and a guide surface following structure connected to said work piece cutting means for guiding said cutting member along a path substantially duplicating said guide surface contour;

wherein said work piece support means comprises a platform member resting on a plurality of platform member legs;

wherein said platform member has a first surface and a second surface and wherein said anchoring and positioning means additionally comprises:

two mutually parallel and laterally spaced apart work piece retaining rails secured to said platform member first surface, for retaining between said retaining rails said work piece to be cut;

a work piece bracing plate secured across said retaining rails and placed apart from said platform member a sufficient distance to permit passage of said work piece between said bracing plate and said platform member;

a clamping plate adjacent to said platform member and directly opposing and spaced apart from said bracing plate a sufficient distance to permit passage of said work piece between said clamping plate and said bracing plate;

clamping plate moving means for moving said clamping plate toward said bracing plate to clamp said work piece between said clamping plate and said bracing plate and to subsequently move said clamping plate away from said bracing plate to release said work piece for removal from said apparatus.

12. The apparatus of claim 11, wherein said clamping plate moving means comprises a work piece clamping lever pivotally mounted on a lever fulcrum structure protruding from said second surface of said platform member, said lever fulcrum structure including two parallel and laterally spaced apart fulcrum flanges, said fulcrum flanges having mutually aligned fulcrum flange bores through which a fulcrum bolt is fitted, said lever having a fulcrum lever bore and being fit between said flanges such that said fulcrum lever bolt passes through said fulcrum lever bore and said fulcrum flange bores simultaneously.

13. The apparatus of claim 12, wherein said work piece clamping lever has a handle end and has a cam end with a cam surface, wherein said cam surface bears against said clamping plate, such that as said handle end is pivoted in one rotational direction, said cam surface rides against said clamping plate to push said clamping plate toward said bracing plate to clamp said work piece between said clamping plate and said bracing plate and thereby anchor said work piece during cutting, and such that as said handle end is pivoted in the other rotational direction said cam surface and thus said clamping plate moves away from said bracing plate and said work piece is thereby released for removal from said apparatus.

14. The apparatus of claim 11, additionally comprising a clamping plate opening in said platform member and wherein said clamping plate fits within said clamping plate opening, said clamping plate opening comprising clamping plate support means for supporting said clamping plate within said clamping plate opening.

15. An apparatus for cutting an end of a work piece having a work piece curved face along a curve which is substantially the mirror image of the cross-sectional curvature of said work piece curved face, comprising:

work piece support means;

work piece anchoring and positioning means for securing said work piece onto said support means in a position to be cut;

a cutting means carriage structure mounted to move toward and away from said end of said work piece;

work piece cutting means slidably mounted on said cutting means guide structure and including a work piece cutting member;

cutting member guide means comprising a guide template having a template guide surface with a guide surface contour;

and a guide surface following structure connected to said work piece cutting means for guiding said cutting member along a path substantially duplicating said guide surface contour;

wherein said following structure comprises a stylus member and wherein said carriage comprises a stylus port into which said stylus member is fitted and secured, and positioned laterally adjacent to said guide template, to abut and ride along said template guide surface.

16. The apparatus of claim 11, wherein said guide template is removably secured to a first surface of said bracing plate with fastener means.

17. The apparatus of claim 1, wherein said guide template is removable, comprising a plurality said guide templates having differently contoured guide surfaces for cutting a variety of curves.

18. An apparatus for cutting an end of a work piece having a work piece curved face along a curve which is substantially the mirror image of the cross-sectional curvature of said work piece curved face, comprising:

work piece support means;

work piece anchoring and positioning means for securing said work piece onto said support means in a position to be cut;

a cutting means carriage structure mounted to move toward and away from said end of said work piece;

work piece cutting means slidably mounted on said cutting means guide structure and including a work piece cutting member;

cutting member guide means comprising a guide template having a template guide surface with a guide surface contour;

and a guide surface following structure connected to said work piece cutting means for guiding said cutting member along a path substantially duplicating said guide surface contour;

wherein said guide template comprises a plurality of parallel and laterally abutting slats having slat guide ends, such that a work piece curved face may be placed against said slat guide ends and said slats may be slid longitudinally relative to each other to each abut said curved face and thus to describe said mirror image of said curved face, and such that said work piece may be subsequently lifted away; and a lateral template plate clamp for applying lateral pressure against said slats such that friction anchors said slats in the staggered arrangement such that said slat guide ends define said mirror image of said curved face;

wherein said slat guide ends together form said guide surface along which said following structure rides to move said work piece cutting member along said path during work piece cutting.

* * * * *